US012683761B2

(12) United States Patent
Glackin et al.

(10) Patent No.: US 12,683,761 B2
(45) Date of Patent: **\*Jul. 14, 2026**

(54) CONFIDENTIAL AUTOMATED SPEECH RECOGNITION

(71) Applicant: VERINT SYSTEMS UK LIMITED, Woking (GB)

(72) Inventors: Cornelius Patrick Glackin, London (GB); Nigel Henry Cannings, London (GB)

(73) Assignee: VERINT SYSTEMS UK LIMITED, Woking (GB)

( * ) Notice: Subject to any disclaimer, the term of this patent is extended or adjusted under 35 U.S.C. 154(b) by 136 days.

This patent is subject to a terminal disclaimer.

(21) Appl. No.: 18/886,357

(22) Filed: Sep. 16, 2024

(65) Prior Publication Data

US 2025/0007692 A1 Jan. 2, 2025

Related U.S. Application Data

(63) Continuation of application No. 17/932,912, filed on Sep. 16, 2022, now Pat. No. 12,120,218.

(30) Foreign Application Priority Data

| | | |
|---|---|---|
| Sep. 20, 2021 | (GB) | 2113383 |
| Sep. 9, 2022 | (GB) | 2213208 |

(51) Int. Cl.
  *H04L 9/06* (2006.01)
  *G06F 21/57* (2013.01)
  (Continued)

(52) U.S. Cl.
  CPC ............ *H04L 9/0631* (2013.01); *G06F 21/57* (2013.01); *G06F 21/6209* (2013.01);
  (Continued)

(58) Field of Classification Search
  CPC ... H04L 9/0631; H04L 9/0825; H04L 9/3066; H04L 9/0861; H04L 9/085; H04L 9/0841; H04L 9/0894; H04L 63/10; H04L 63/104; H04L 9/3239; H04L 9/0637; H04L 9/0643; H04L 9/0625; H04L 63/166; H04L 65/65; H04L 63/08; G06F 21/57; G06F 21/6209;
  (Continued)

(56) References Cited

U.S. PATENT DOCUMENTS

| | | | |
|---|---|---|---|
| 10,305,877 B1 * | 5/2019 | Fox | H04L 63/166 |
| 11,546,156 B1 | 1/2023 | Hendry et al. | |

(Continued)

FOREIGN PATENT DOCUMENTS

| | | | | |
|---|---|---|---|---|
| CN | 109800584 A | 5/2019 | | |
| EP | 3552341 B1 * | 6/2022 | ......... | H04L 63/0435 |

(Continued)

*Primary Examiner* — Kyung H Shin
(74) *Attorney, Agent, or Firm* — Dinsmore & Shohl LLP

(57) ABSTRACT

The present invention provides a secure method for outsourcing data analysis to a third party without the third party being able to access the data in clear. In the present invention, the client's data is never written to disk, this feature provides the security. The data is decrypted and processed in the enclave which ensures that the data is secure and hidden at all times when it is visible "in clear".

18 Claims, 2 Drawing Sheets

Figure 1:
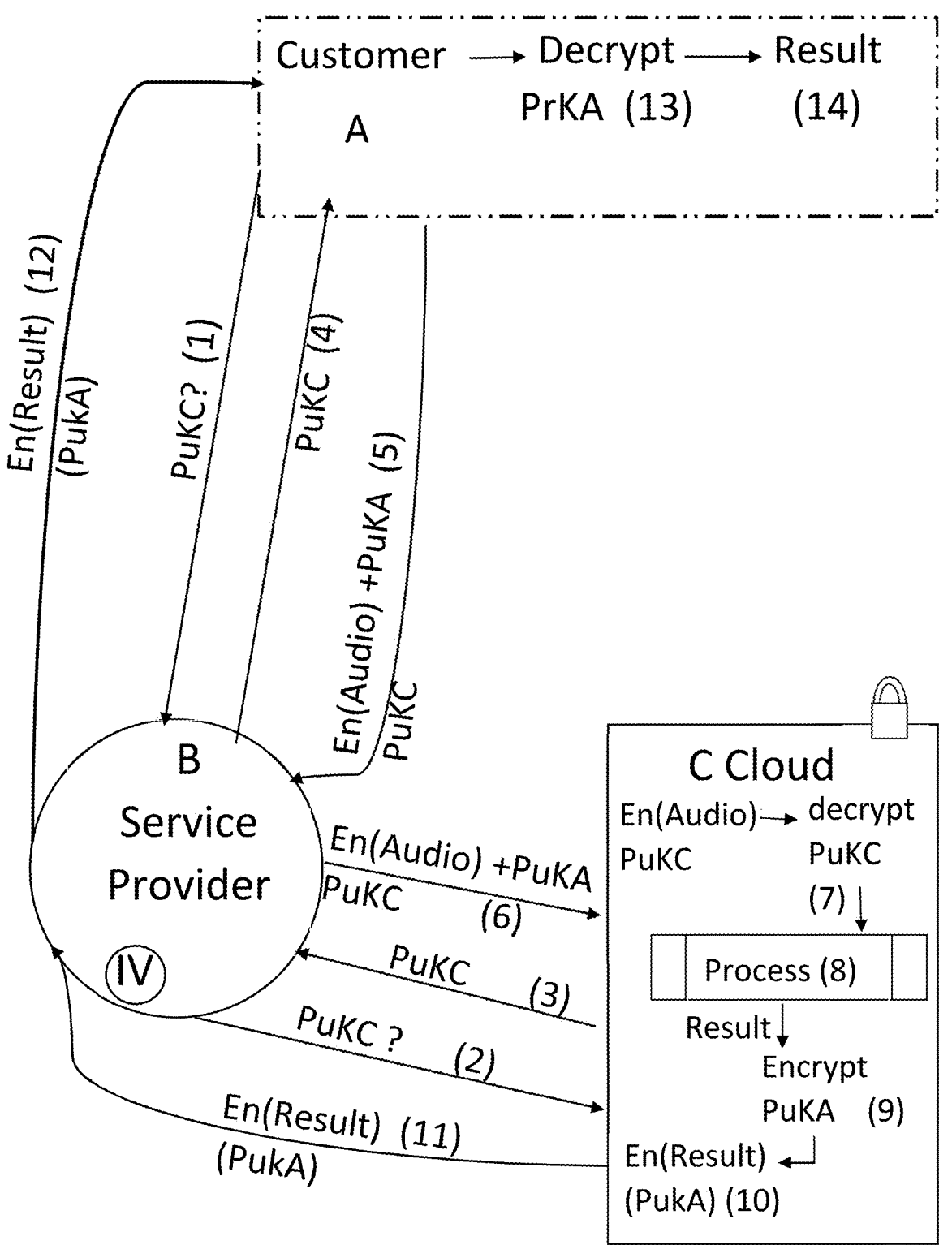

(51) Int. Cl.

| | |
|---|---|
| *G06F 21/62* | (2013.01) |
| *G10L 15/22* | (2006.01) |
| *H04L 9/08* | (2006.01) |
| *H04L 9/30* | (2006.01) |

(52) U.S. Cl.

CPC ............ *G10L 15/22* (2013.01); *H04L 9/0825* (2013.01); *H04L 9/3066* (2013.01)

(58) Field of Classification Search

CPC .... G06F 21/53; G06F 21/606; G06F 21/6254; G10L 15/22; G10L 15/28; G09C 1/00; H04W 12/08

See application file for complete search history.

(56) References Cited

U.S. PATENT DOCUMENTS

| | | | |
|---|---|---|---|
| 2018/0241572 A1 | 8/2018 | Miele et al. | |
| 2019/0012935 A1* | 1/2019 | Liu | H04L 9/3239 |
| 2019/0052613 A1* | 2/2019 | Karlsen | G06F 16/178 |
| 2020/0162463 A1* | 5/2020 | Dykstra | H04L 63/10 |
| 2021/0081545 A1* | 3/2021 | Mulligan | G06F 9/45558 |

FOREIGN PATENT DOCUMENTS

| | | | |
|---|---|---|---|
| KR | 102447251 B1 | 9/2022 | |
| KR | 102467687 B1 | 11/2022 | |
| WO | 2021006973 A1 | 1/2021 | |
| WO | 2021091744 A1 | 5/2021 | |

\* cited by examiner

CONFIDENTIAL AUTOMATED SPEECH RECOGNITION

CROSS-REFERENCE TO RELATED APPLICATIONS

This application is a continuation of and claims the benefit of priority to pending U.S. Nonprovisional patent application Ser. No. 17/932,912, filed Sep. 16, 2022, which claims the benefit of priority under 35 U.S.C. § 119 to GB Patent Application No. 2113383.0, filed on Sep. 20, 2021, and GB Patent Application No. 2213208.8, filed on Sep. 9, 2022, the entireties of which are incorporated by reference herein.

BACKGROUND

In many activities involving big data, cloud computing offers a common distributed infrastructure for the storage of large amounts of data in a scalable, efficient, and low-cost way. For sensitive data, there is the possibility to use encryption for the secure storage of data in the cloud. While we have become increasingly good at encrypting data at rest, in order to process the data on the cloud we first need to decrypt it, which in turn excludes the possibility for using the cloud's resources to process sensitive data, unless it can be done in a secure way. Cloud users want to hide sensitive data, from cloud providers; similarly, companies using cloud services want to protect their intellectual property from cloud providers and users. Hence the need for strategies for processing data securely in the cloud becomes increasingly more important.

Cloud based data processing allows businesses be more flexible and efficient in their data analysis. The data analysis requirements of businesses may fluctuate regularly and the use of cloud based solutions alleviates the need to invest heavily in hardware to deal with a maximum analysis requirement if this maximum analysis requirement is a rare or one off occurrence. Instead, cloud processing allows businesses to be flexible with their computing power to suit their more immediate needs.

One of the barriers to cloud adoption however is the fact that data has to be "in clear" (unencrypted) at some point in its processing lifecycle. To help overcome that, a number of schemes have been proposed where data is loaded into an enclave that cannot be accessed from the outside, and the processing takes place in a highly confidential way. An enclave is a set of system resources that operate in the same security domain and that share the protection of a single, common, continuous security perimeter. Enclaves are useful in that even if the data inside them is in clear, the in clear data will not be visible to any external parties as it is hidden within the enclave. Enclaves are highly resistant to hacking making them safe places to analyse sensitive data.

The above approach falls down when an external provider is required to process the data. The user can no longer put the data in their own enclave, it must go to a third party therefore in existing systems, a user cannot pass data to an external provider whilst maintaining a high level of security.

What is required is a method for confidential data processing that enables a client to employ external providers to process their data without the provider being able to access an unencrypted version of the data.

WO2021091744A1 discloses a confidential computing mechanism wherein execution logic is configured to perform a linear capability transfer operation which transfers a physical capability from a partition of a first software modules to a partition of a second of software module without retaining it in the partition of the first.

WO2021006973A1 discloses a system wherein memory is partitioned and isolated in container-based memory enclaves. The container-based memory enclaves have attestable security guarantees. During provisioning of the container-based memory enclaves from a container image, a purported link in the container to a memory address of the enclave is modified to verifiably link to an actual memory address of the host, such as partitioned memory enclave. In some instances, enclave attestation reports can be validated without transmitting corresponding attestation requests to remote attestation services, based on previous attestation of one or more previous container attestation reports from a similar container and without requiring end-to-end attestation between the container and remote attestation service for each new attestation request.

SUMMARY

The present invention in its various aspects is as defined in the appended claims.

The present invention provides:

A computer implemented method for confidential data processing, the method comprising the following steps:

Requesting, by a client computer, an enclave public key from an Application Programming Interface, API.

Requesting, by the API, the enclave public key from an enclave.

Generating, by the enclave, the enclave public key. The enclave public key is stored in an encrypted memory of the enclave along with a corresponding enclave private key;

Retuning, by the confidential enclave, the enclave public key to the API.

Retuning, by the API, the enclave public key to the client.

Encrypting, by the client computer, one or more files using the enclave public key.

Sending, by the client computer; the one or more encrypted files and a client public key to the API.

Sending, by the API, the one or more encrypted file and a client public key to the enclave.

Decrypting, by the enclave, the one or more encrypted files, using the enclave private key. The decrypted one or more files are kept in the encrypted memory of the confidential enclave. This ensures that the client's data is never visible in an unencrypted form to the API or to any potential attacker.

Processing, by the enclave, the one or more files to produce one or more result files.

Encrypting, by the enclave, the one or more result files using the client public key.

Sending by the enclave, the one or more result files to the API.

Sending by the API, the one or more audio files to the client computer.

Decrypting, by the client computer, one or more result files using the client private key.

The present invention therefore provides a secure method for outsourcing data analysis to a third party without the third party being able to access the data in clear. In the present invention, the client's data is never written to disk, this feature provides the security. If the client's data were written to disk that data would be visible even in the confidential domain. The data is decrypted and processed in the enclave which ensures that the data is secure and hidden at all times when it is visible "in clear".

The enclave may preferably be a cloud enclave.

The enclave public key may be ephemeral so as to improve security. The public key may preferably last for between 1 hour and one day, further preferably between 2 and 6 hours. The client computer may further preferably be provided, by the API, with an indication of how long the public key is valid for.

The enclave may be one of a plurality of enclaves. Further the API may select one of the plurality of enclaves for requesting the enclave public key dependent on one or both of size of enclave memory, enclave processing speed. Alternatively or in addition, the API may select the enclave based on a level of security of the enclave.

In the case that the enclave is one of a plurality of enclaves, following the step of Requesting, by a client computer, an enclave public key from an Application Programming Interface, API, the method may include: Requesting, by the API, one or more of a total file size, security level and speed.

The total file size is the size in bytes of the one or more files that the client wishes to have processed in the enclave.

The security level may be represented by a plurality of discrete security levels. For example, high, medium, low. This may allow the API to select the most appropriate enclave. For example, if the client's data is highly sensitive and they have selected the highest security level, the API would select a highly secure enclave to request the enclave public key from such that the processing will be performed in a highly secure enclave.

The speed indicates a preferred speed and may be indicated by discrete levels such as fast or slow. The API may use the user's selection to determine the most appropriate enclave to perform the processing dependent upon the processing speeds of the available enclaves. An enclave may be defined as being a fast enclave or a slow enclave dependent on the processing speed of the enclave. Fast enclaves may be all enclaves with a processing speed at or above a threshold speed whereas slow enclaves would be all enclaves with processing speeds below the threshold.

The method may then further include, returning by the client computer, one or more of the total file size, security level and speed to the API. In response to receiving the one or more of the total file size, security level and speed to the API, the API may then select an enclave of the plurality of enclaves based on what the client computer returned. The selected enclave being the enclave that the API will request the enclave public key from.

Preferably, in the case that the enclave is one of a plurality of enclaves, following the step of Requesting, by a client computer, an enclave public key from an Application Programming Interface, API, the method may include: Requesting, by the API, one or more of a total file size.

The method may then further include, returning by the client computer, the total file size. In response to receiving the total file size select an enclave of the plurality of enclaves by first determining which of the enclaves that has a memory large enough to accommodate the client's data and then choosing, of those enclaves, the enclave with the memory most closely matches the size of the client's data. The selected enclave being the enclave that the API will request the enclave public key from. This allows the API to more efficiently distribute processing from multiple clients across a number of enclaves by minimising the amount of unused enclave memory.

The one or more files may be audio files. In this case the processing carried out by the enclave may be automatic speech recognition.

Alternatively, the files may include training data for machine learning. In this case the processing being carried out may be training a machine learning algorithm.

The API may be configured to provide one or more data processing services. In this case, following the step of Requesting, by a client computer, an enclave public key from an Application Programming Interface, API, the method may include: Requesting, by the API, a selection of data processing service. The API may provide an interface for the user to select from the one or more data processing services. Following Requesting, by the API, a selection of data processing service, the method will further include returning, by the client computer, the selection of data processing service. In response to receiving the selection of data processing service, the API moves onto the step of requesting the enclave public key from the enclave. The API may have access to a plurality of enclaves, each enclave set up to process data according to one of the one or more data processing services, in this case, the API will request the enclave public key from the enclave that is set up to process data in the way that the client computer selected.

In the present invention, key sharing between the client computer and the enclave takes place without any private keys being visible to the API.

The method may begin with an identity management process. Identity management may be a simple user name and password authentication process.

For the purposes of this specification an enclave is understood to be a secure enclave.

The API may preferably be a cloud API.

The public encryption scheme used by the present invention may be based on Elliptic Curve Cryptography, for example Curve25519 (Bernstien's Elliptic Curve or standard curves).

The present invention may preferably be implemented on an encryption enabled processor as a preferred hardware.

The present invention separates the user from the enclave provider (third party cloud provider), this provides additional protection using the API service provider B, which provides additional security for the IP contained in the enclave C, and anonymity for the customer.

DETAILED DESCRIPTION

The present invention will now be described in terms of the following figures:

FIG. 1: A block diagram illustrating the steps taken in the present invention.

Figure 2:
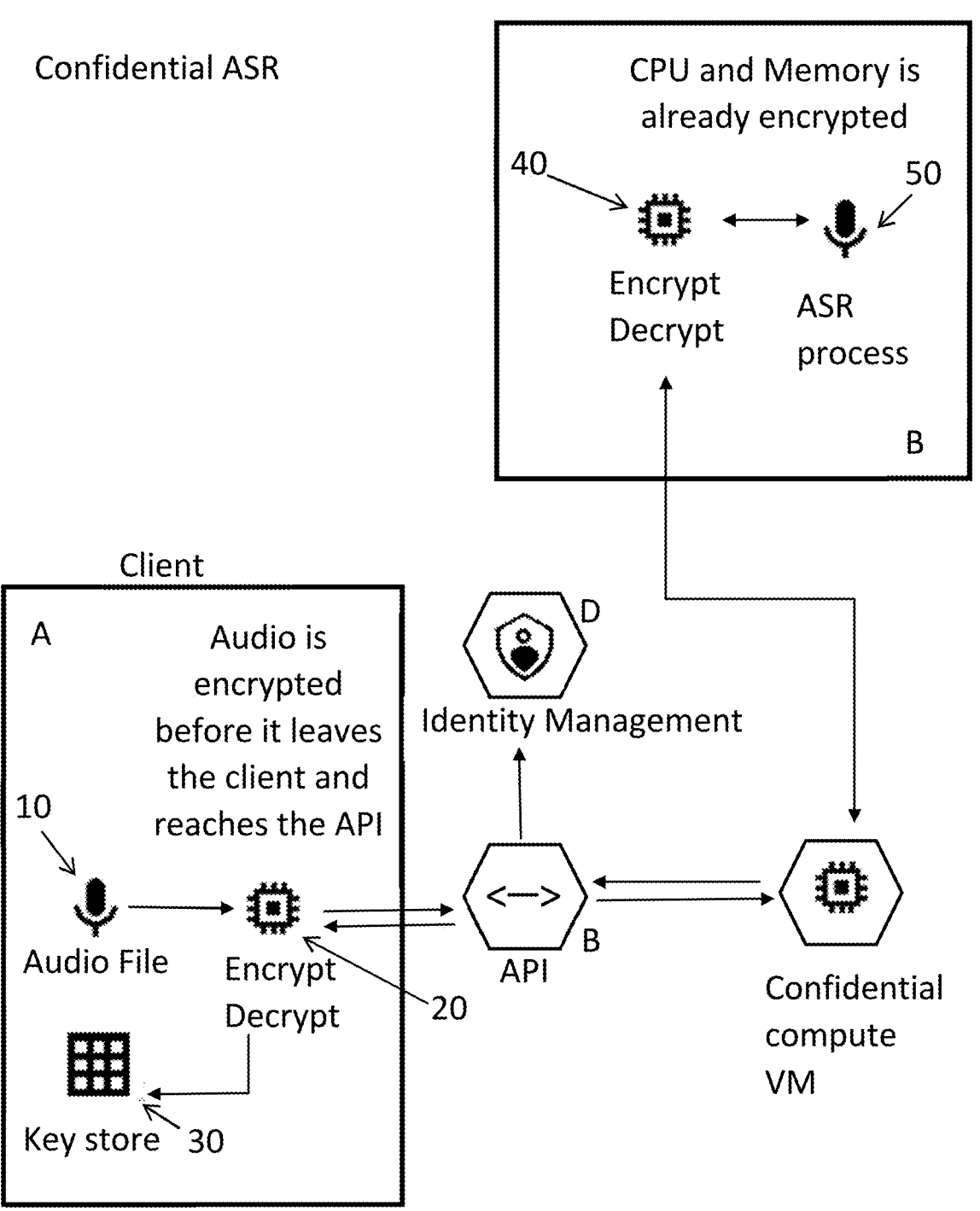

FIG. 2: A block diagram according to the present invention.

FIG. 1 illustrates the steps of the present invention for the case where the enclave is a cloud enclave in a block diagram that illustrates the entities involved in the process. FIG. 1 uses the example of the file sent by the client computer being an audio file. The diagram shows three entities, the customer (client computer), A, the service provider (API), B, and the cloud enclave, C.

At step 1, the customer A requests the enclave public key (PuKC) from the Service provider B. At step 2, the service provider B requests the enclave public key (PuKC) from the cloud enclave C. at step 3, the cloud enclave C returns the enclave public key (PuKC) to the service provider B and at step 4 the service provider B returns the enclave public key (PuKC) to the customer A.

The customer A will then encrypt their file using the enclave public key (PuKC). At step 5, the customer A returns the encrypted file to the service provider B along with the client public key (PuKA) to the service provider B. At step 6, the service provider returns the encrypted file and client public key to the cloud enclave C.

At step 7, the cloud enclave C decrypts the encrypted file using the enclave private key (PrKC). At step 8 the cloud enclave C processes the data in the decrypted file to produce a result. At step 9, the cloud enclave C encrypts the result using the client public key (PuKA) to produce an encrypted result at step 10. At step 11, the cloud enclave C returns the encrypted result to the service provider B and at step 12 the service provider B returns the encrypted result to the customer A. The customer A can then at step 13 decrypt the result using the client private key (PrKA) to access the result of the processing at step 14.

FIG. 2 illustrates a block diagram of the present invention for the case where the one or more files is an audio file, the processing is automatic speech recognition (ASR).

The client computer A is in communication with the API B. The API B is in communication with the client computer A, the cloud enclave C and an identity management module D. The enclave C (confidential compute virtual machine (vm)) is in communication with the API. The Identity management module D is in communication with the API.

The client computer A has access to an audio file 10, first processing means for providing encryption and decryption facilities 20 and a key store. The enclave C has second processing means for providing encryption and decryption facilities 40 and processing means for performing automatic speech recognition 50.

The enclave C contains an Automatic Speech Recognition model that has been trained in clear outside of the enclave. Such a model could be an image classifier or an automatic speech recognition model. Such models contain significant intellectual property that needs to be protected. Models are compressed using quantization and mixed-precision parameters for computational efficiency and reduced memory overhead.

In this example use case, customer has audio they want to process but they don't want to disclose the audio as it contains sensitive content as well as biometric voice signatures. The customer encrypts the audio with a public encryption scheme using the public enclave key they received from the service provider C (they don't see the enclave directly). They also provide their own public key PuKC, this will be used by the enclave after processing the audio to encrypt the results before sending back to A. The results data cannot be decrypted once encrypted with the PuKC except by the A's private key PrKC (which is never shared). The enclave decrypts the transmitted data packet (containing the encrypted audio data and A's public key) with the enclave private key inside the enclave. Within the enclave the audio data is now in clear and can be processed by the ASR model residing in the enclave in the normal way. The ASR generated transcript is then encrypted using A's provided public key and returned to A for subsequent decryption by A's private key. In this way, neither the enclave provider (third party) or the API service provider sees the audio data or its transcription in clear as these only exist in enclave memory or behind customer A's firewall. In this way, the invention also physically disconnects the enclave provider C from the customer A, using the API service provider B, which provides additional security for the IP contained in the enclave C, and anonymity for the customer.

The invention claimed is:

1. A computer implemented method for confidential data processing, the method comprising:

generating, by an enclave, an enclave public key;

transmitting, by the enclave, the enclave public key to an Application Programming Interface (API), wherein the enclave public key is stored in an encrypted memory of the enclave along with a corresponding enclave private key;

receiving, by the enclave from the API, one or more encrypted files and a client public key;

decrypting, by the enclave, the one or more encrypted files, using the enclave private key;

storing the decrypted one or more files in the encrypted memory of the enclave;

processing, by the enclave, the decrypted one or more files to produce one or more result files;

encrypting, by the enclave, the one or more result files using the client public key; and sending, by the enclave, the one or more result files to the API for decryption by a downstream entity.

2. The computer implemented method of claim 1, wherein the enclave is a cloud enclave.

3. The computer implemented method of claim 1, wherein the enclave public key is ephemeral.

4. The computer implemented method of claim 1, wherein the enclave is one of a plurality of enclaves; and the API selects one of the plurality of enclaves for requesting the enclave public key dependent on one or both of size of enclave memory, enclave processing speed.

5. The computer implemented method of claim 1, wherein the one or more files are audio files.

6. The computer implemented method of claim 5, wherein the processing carried out by the enclave is automatic speech recognition.

7. The computer implemented method of claim 1, wherein the API provides one or more data processing services.

8. A data processing system comprising means for carrying out the method of claim 1.

9. A processor configured to transmit a computer program containing instructions for performing a method as claimed in claim 1.

10. The computer implemented method of claim 1, wherein the downstream entity is a client computer.

11. A system comprising:

at least one processor; and at least one data storage comprising instructions which, when executed by the at least one processor, cause the at least one processor to perform a method for conducting a mobile device transaction, the method comprising:

generating, by an enclave, an enclave public key;

transmitting, by the enclave, the enclave public key to an Application Programming Interface (API), wherein the enclave public key is stored in an encrypted memory of the enclave along with a corresponding enclave private key;

receiving, by the enclave from the API, one or more encrypted files and a client public key;

decrypting, by the enclave, the one or more encrypted files, using the enclave private key;

storing the decrypted one or more files in the encrypted memory of the enclave;

processing, by the enclave, the decrypted one or more files to produce one or more result files;

encrypting, by the enclave, the one or more result files using the client public key; and sending, by the enclave, the one or more result files to the API for decryption by a downstream entity.

12. The system of claim 11, wherein the enclave is a cloud enclave.

13. The system of claim 11, wherein the enclave public key is ephemeral.

14. The system of claim 11, wherein the enclave is one of a plurality of enclaves; and the API selects one of the plurality of enclaves for requesting the enclave public key dependent on one or both of size of enclave memory, enclave processing speed.

15. The system of claim 11, wherein the one or more files are audio files.

16. The system of claim 15, wherein the processing carried out by the enclave is automatic speech recognition.

17. The system of claim 11, wherein the API provides one or more data processing services.

18. The system of claim 11, wherein the downstream entity is a client computer.

\* \* \* \* \*